US 011248743B2

(12) United States Patent
Emrich et al.

(10) Patent No.: US 11,248,743 B2
(45) Date of Patent: Feb. 15, 2022

(54) COMPOSITE DRAIN PAN

(71) Applicant: Bell Helicopter Textron Inc., Fort Worth, TX (US)

(72) Inventors: Joshua A. Emrich, Grapevine, TX (US); Patrick Paquin, Mirabel (CA); Eric C. Terry, Fort Worth, TX (US); Brent Scannell, L'ile-Bizard (CA); Thomas Mast, Carrollton, TX (US)

(73) Assignee: Textron Innovations Inc., Fort Worth, TX (US)

( * ) Notice: Subject to any disclaimer, the term of this patent is extended or adjusted under 35 U.S.C. 154(b) by 548 days.

(21) Appl. No.: 16/155,208

(22) Filed: Oct. 9, 2018

(65) Prior Publication Data

US 2020/0109816 A1    Apr. 9, 2020

(51) Int. Cl.
*F16N 31/00* (2006.01)
*B64C 1/14* (2006.01)
*B64D 33/00* (2006.01)
*B64C 27/04* (2006.01)
*F01M 11/00* (2006.01)

(52) U.S. Cl.
CPC .......... *F16N 31/006* (2013.01); *B64C 1/1453* (2013.01); *B64D 33/00* (2013.01); *B64C 27/04* (2013.01); *F01M 11/0004* (2013.01); *F01M 2011/0016* (2013.01)

(58) Field of Classification Search
CPC ... F16N 31/006; F16N 31/002; B64C 1/1453; B64C 27/04; B64D 33/00; B64D 45/00; B64D 2045/009; B64D 47/00; F01M 11/0004; F01M 2011/0016; F02B 77/10; F02B 77/04; A62C 3/08; A62C 4/00
See application file for complete search history.

(56) References Cited

U.S. PATENT DOCUMENTS 3,131,892 A    5/1964   Moises
4,498,433 A *  2/1985   Ogawa .................... B29C 51/16
                                                  123/90.38

(Continued)

FOREIGN PATENT DOCUMENTS

EP       3636544 B1     3/2021

OTHER PUBLICATIONS

Bell 525 Relentless (Product Diagram), Bell Helicopter, A Textron Company; Flight International from Flightglobal Tim Hall (FRAeS, Fort Worth, Texas), Reed Business Information, Published Nov. 12, 2014. (1 page).

(Continued)

*Primary Examiner* — Syed O Hasan
(74) *Attorney, Agent, or Firm* — Patent Capital Group

(57) ABSTRACT

In some examples, a drain pan comprises a composite material forming a reservoir and a drain. The composite material comprises a polymeric resin and a reinforcing fiber. The reservoir is to catch a liquid from an engine and to support a step load. The drain is to drain the liquid from the reservoir. In some examples, a method comprises attaching a drain pan to an aircraft proximate an engine. The drain pan comprises a composite material forming a reservoir and a drain. The method further comprises catching a liquid from the engine in the reservoir of the drain pan and draining the liquid from the reservoir through the drain. In addition, the method comprises supporting a step load on the reservoir of the drain pan.

20 Claims, 13 Drawing Sheets

(56) References Cited

U.S. PATENT DOCUMENTS

| | | | |
|---|---|---|---|
| 5,457,154 A * | 10/1995 | Ohta | C08G 73/1067 524/600 |
| 5,705,006 A | 1/1998 | Roudebush et al. | |
| 6,189,833 B1 | 2/2001 | Ambrose et al. | |
| 9,358,410 B2 | 6/2016 | Jullie et al. | |
| 2009/0241442 A1 | 10/2009 | MacLean et al. | |
| 2012/0023897 A1 | 2/2012 | DeDe et al. | |
| 2012/0312914 A1 | 12/2012 | Wilson et al. | |
| 2014/0263819 A1 * | 9/2014 | Wilson | F16N 31/006 244/17.11 |
| 2015/0197346 A1 * | 7/2015 | Jullie | B64C 1/1453 244/129.2 |

OTHER PUBLICATIONS

Perry, Dominic, "ANALYSIS: Bell 525 Relentless Cutaway and Technical Description", Flight Global, Flight International, Bell Helicopter, Published Nov. 12, 2014. (8 pages).

EPO Search Report issued in EP Application 19150286.3 dated May 24, 2019, 4 pages.

EPO Examination Report issued in EP Application 19150286.3 dated Jun. 18, 2020, 4 pages.

EPO Examination Report issued in EP Application 19150286.3 dated Jun. 28, 2019, 7 pages.

\* cited by examiner

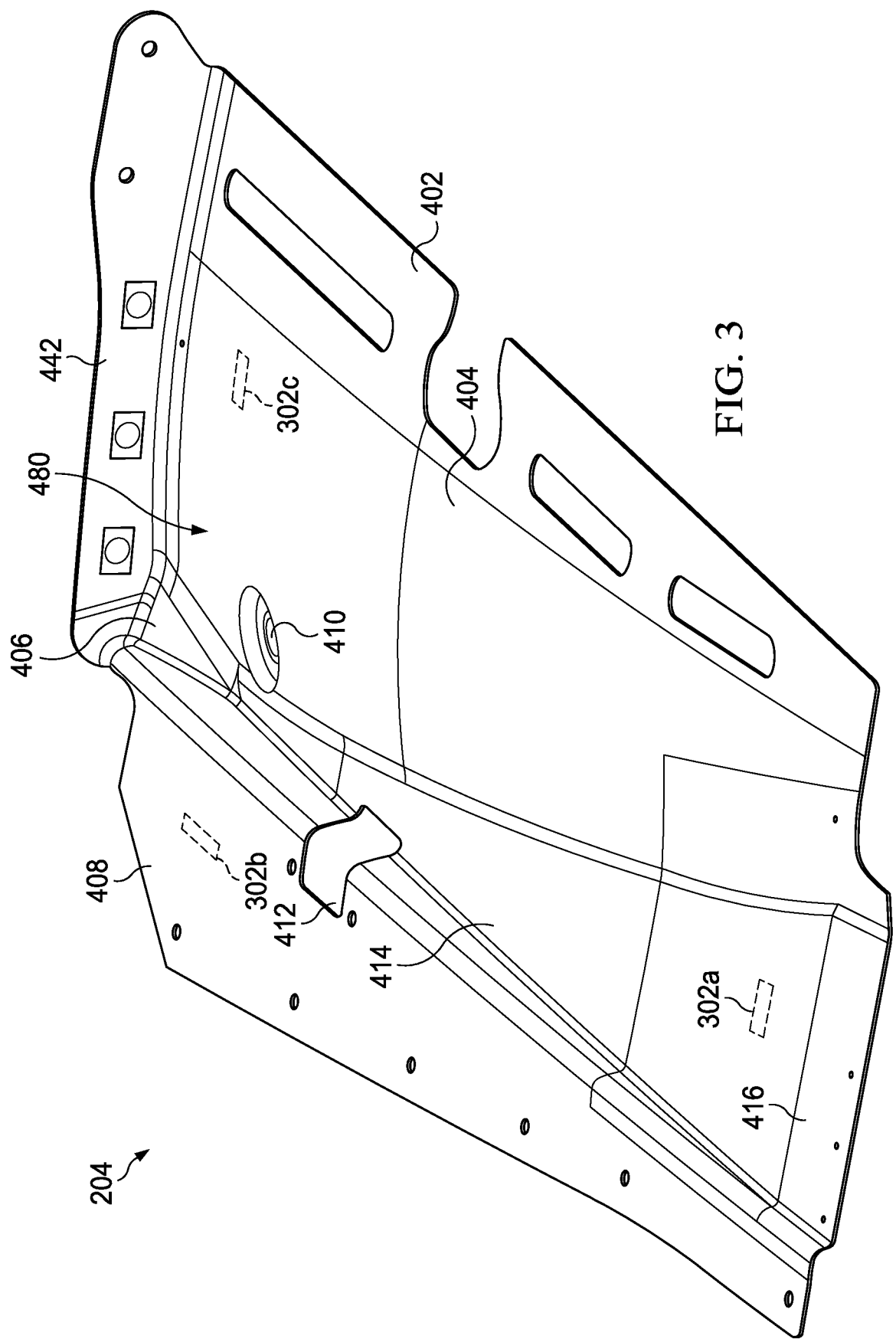

COMPOSITE DRAIN PAN

TECHNICAL FIELD

This disclosure relates generally to aircraft systems, and more particularly, though not exclusively, to drain pans made of a composite material and integrating drainage features with support for step loads.

BACKGROUND

Aircraft include many systems that facilitate operation of the aircraft and/or provide comfort to occupants of the aircraft. For example, engines provide power, either directly or indirectly, to other systems such as rotor systems, gear boxes, flight control systems, interior environmental control systems, and the like. Such systems can include liquid to facilitate operation. For example, lubricants are employed to reduce wear on components, coolants transfer heat away from components, and fuel is burned to power some components. These liquids can sometimes escape from their respective systems.

SUMMARY

In some examples, a drain pan comprises a composite material forming a reservoir and a drain. The composite material comprises a polymeric resin and a reinforcing fiber. The reservoir is to catch a liquid from an engine and to support a step load. The drain is to drain the liquid from the reservoir.

In some examples, an aircraft comprises an engine and a drain pan. The drain pan comprises a composite material forming a reservoir and a drain. The composite material comprises a polymeric resin and a reinforcing fiber. The reservoir is to catch a liquid from the engine and to support a step load. The drain is to drain the liquid from the reservoir.

In some examples, a system comprises a first drain pan and a second drain pan. Each of the first drain pan and the second drain pan comprises a composite material forming a reservoir and a drain. The composite material comprises a polymeric resin and a reinforcing fiber. The reservoir is to catch a liquid from an engine and to support a step load. The drain is to drain the liquid from the reservoir.

In some examples, a method comprises attaching a drain pan to an aircraft proximate an engine. The drain pan comprises a composite material forming a reservoir and a drain. The method further comprises catching a liquid from the engine in the reservoir of the drain pan and draining the liquid from the reservoir through the drain. In addition, the method comprises supporting a step load on the reservoir of the drain pan.

In some examples, a method comprises providing a mold comprising a first surface corresponding to a reservoir and second surface corresponding to a drain. The method further comprises supporting a sheet of reinforcing fiber on the mold. In addition, the method comprises generating a drain pan from a composite material by applying a polymeric resin to the sheet of reinforcing fiber on the mold. The drain pan comprises the reservoir and the drain. The composite material comprises the polymeric resin and the sheet of reinforcing fiber.

BRIEF DESCRIPTION OF THE DRAWINGS

FIGS. 3, 4A, and 4B illustrate various drain pans, in accordance with some embodiments of the present disclosure.

FIGS. 8, 9, 10, and 11 illustrate further details of a liquid drainage system, in accordance with some embodiments of the present disclosure.

DETAILED DESCRIPTION

Figure 1A:
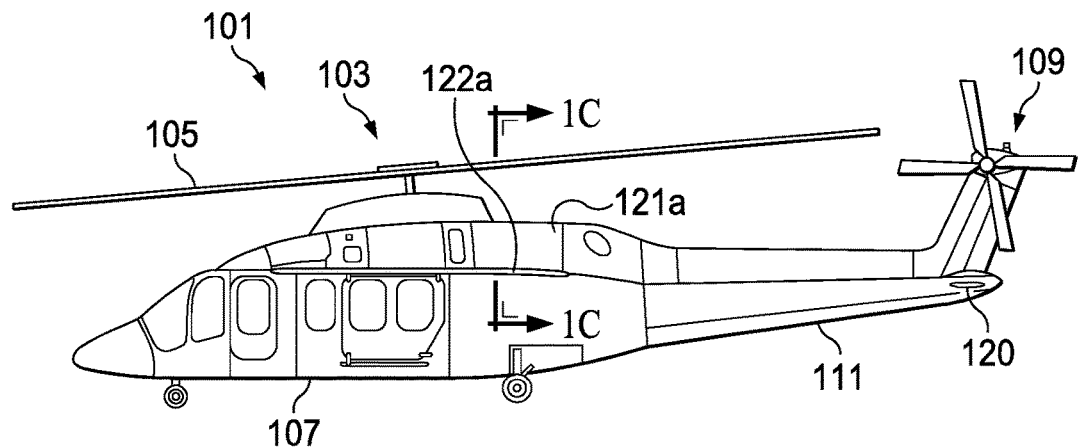
FIGS. 1A, 1B, and 1C illustrate an aircraft in accordance with some embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will be appreciated that in the development of any actual embodiments, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for simplicity and clarity and does not, in itself, dictate a relationship between the various embodiments and/or configurations discussed.

Example embodiments that may be used to implement the features and functionality of this disclosure will now be described with more particular reference to the attached Figures.

Figure 1B:
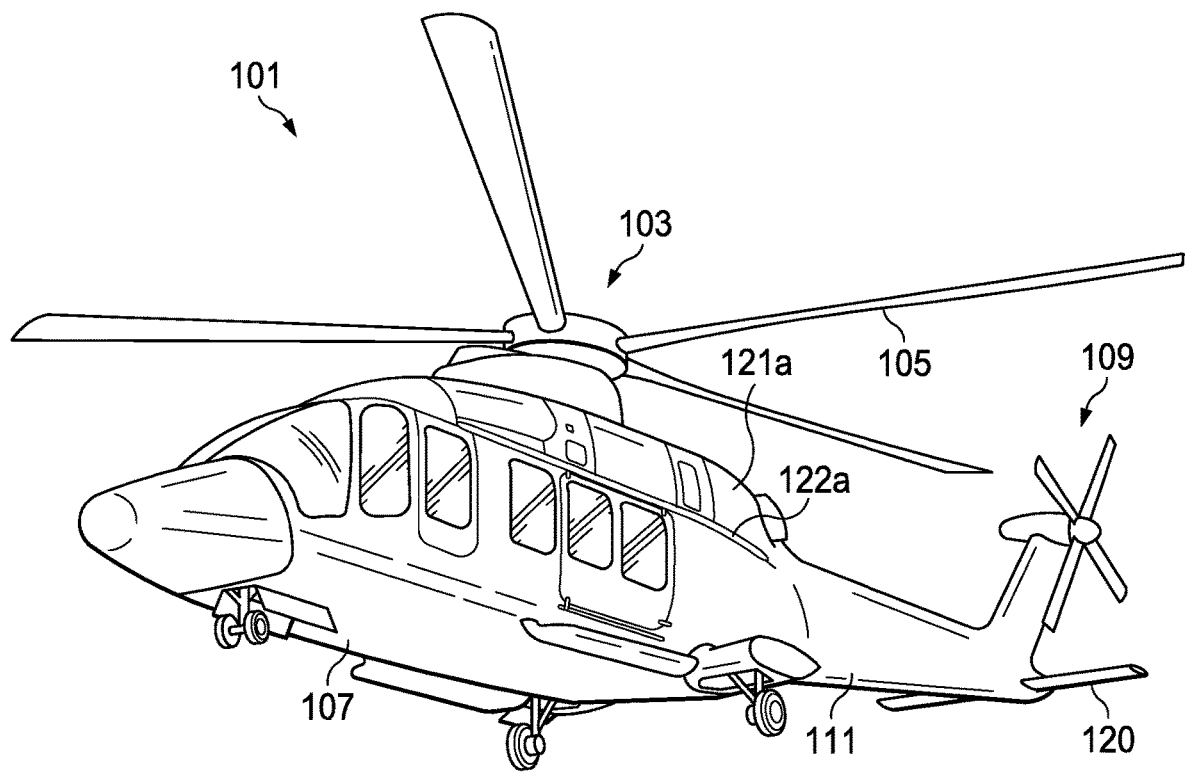
Figure 1C:
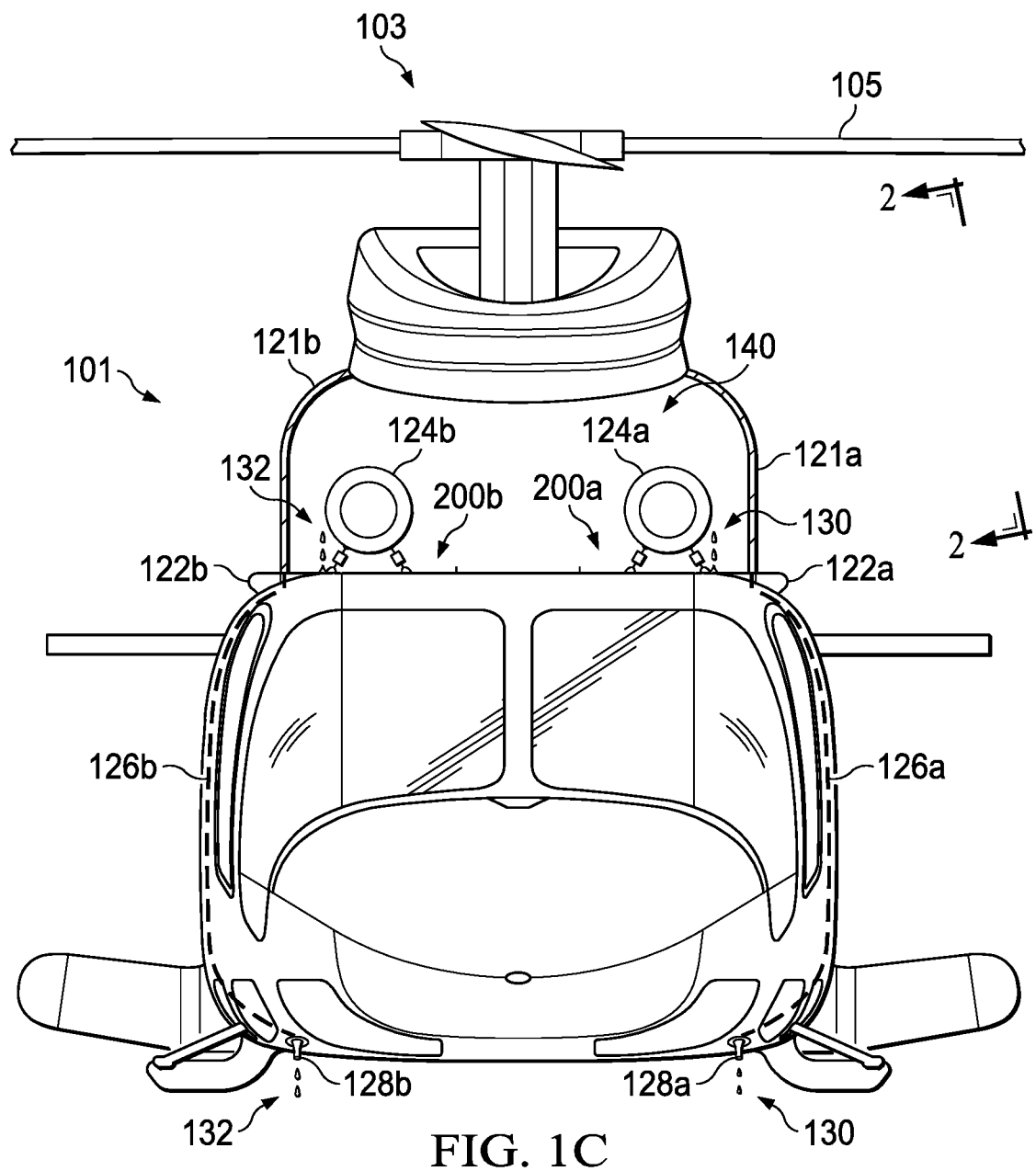

FIGS. 1A, 1B, and 1C illustrate an example of an aircraft, which in this case is a rotorcraft 101. FIG. 1A illustrates a side view of the rotorcraft 101, while FIG. 1B illustrates a perspective view of the rotorcraft 101. FIG. 1C illustrates a front, partially cutaway view of the rotorcraft 101. The rotorcraft 101 includes an airframe (not shown) and a rotor system 103 coupled to the airframe. The rotor system 103 comprises a plurality of rotor blades 105. The pitch of each rotor blade 105 can be managed or adjusted to selectively control direction, thrust, and lift of the rotorcraft 101. The rotorcraft 101 further includes a fuselage 107, tail rotor and anti-torque system 109, an empennage 111, and a tail structure 120, each of which is attached to the airframe. The tail structure 120 may be used as a horizontal stabilizer. Torque is supplied to the rotor system 103 and the anti-torque system 109 using engines 124a and 124b, which are shown in FIG. 1C. The engines 124a and 124b are the primary source of power and torque for the rotorcraft 101. The rotorcraft 101 also includes tracks 122a and 122b and a variety of fairings configured to cover or protect components of the rotorcraft 101 and reduce aerodynamic drag. The tracks 122a and 122b facilitate users accessing upper portions of the rotorcraft 101 such as fairings 121a and 121b. The fairings 121a and 121b cover a compartment 140 in which the engines 124a and 124b are located. Each of the fairings 121a and 121b are affixed, for example by mechanical fasteners and/or pivots, to the fuselage 107. The fairings 121a and 121b can be moved between an open position and a closed position to enable access to the compartment 140 and/or the engines 124a and 124b, e.g., by inspection and/or maintenance personnel. FIG. 1C illustrates, among other things, liquid drainage systems 200a and 200b located under the engines 124a and 124b, respectively. One or both of the engines 124a and 124b can leak or otherwise expel liquids 130 and 132, respectively, into the compartment 140. In general, the liquids 130 and 132 may be expelled from any system such as a reduction gearbox, a hydraulic pump, a generator, an engine accessory system, a fuel pump, a lubrication system and/or a cooling system. Such liquids are often flammable and/or are at temperatures of 1500 degrees Fahrenheit or higher. For example, the liquids 130 and/or 132 can include a petroleum-based fuel, a coolant, a heat-transfer fluid, a hydraulic fluid, and/or a lubricant. Alternatively, the liquids 130 and/or 132 may be non-flammable and can include water and/or a water-based solution. For example, water may enter the compartment 140 through cooling ducts or other gaps while the rotorcraft 101 is subjected to rainy weather conditions and/or pressurized water (such as while washing the engine or fuselage). The liquid drainage systems 200a and 200b catch the liquids 130 and 132 and carry them to locations outside the compartment 140. In this example, the liquid drainage systems 200a and 200b include tubes 126a and 126b, respectively, which transfer captured liquid to outlets 128a and 128b located on an underside of the rotorcraft 101. The compartment 140 may be part of a critical "fire zone" in which fires are more likely to occur than other portions of the rotorcraft 101. The outlets 128a and 128b provide a location at which to expel the liquids 130 and 132 from the rotorcraft 101 that is separate from the compartment 140 and outside of the fire zone. The liquid drainage systems 200a and 200b efficiently evacuates liquids (such as liquids 130 and/or 132 and other liquids that enter the compartment 140) and, thereby, reduces the likelihood of the liquids accumulating to a hazardous quantity, which could present a risk of fire or explosion in the compartment 140 or the fire zone. In addition, the liquid drainage systems 200a and 200b draining the liquids reduces the likelihood of the liquids accumulating to a level that could accidentally flood or spill into components in and around the compartment 140 that are not intended to receive liquid infiltration such as an air inlet system.

It should be appreciated that the rotorcraft 101 of FIGS. 1A, 1B, and 1C is merely illustrative of a variety of aircraft that can be used to implement embodiments of the present disclosure. Other aircraft implementations can include, for example, tiltrotors, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

The liquid drainage systems 200a and 200b may be subject to technical challenges beyond that of only carrying engine liquids. For example, because the fairings 121a and 121b and the tracks 122a and 122b on the rotorcraft 101 provide people with access to the engines 124a and 124b and other components in the compartment 140, an area in and around the compartment 140 can experience frequent foot traffic. Such foot traffic can potentially damage components of the rotorcraft 101 such as the liquid drainage systems 200a and 200b.

Figure 2:
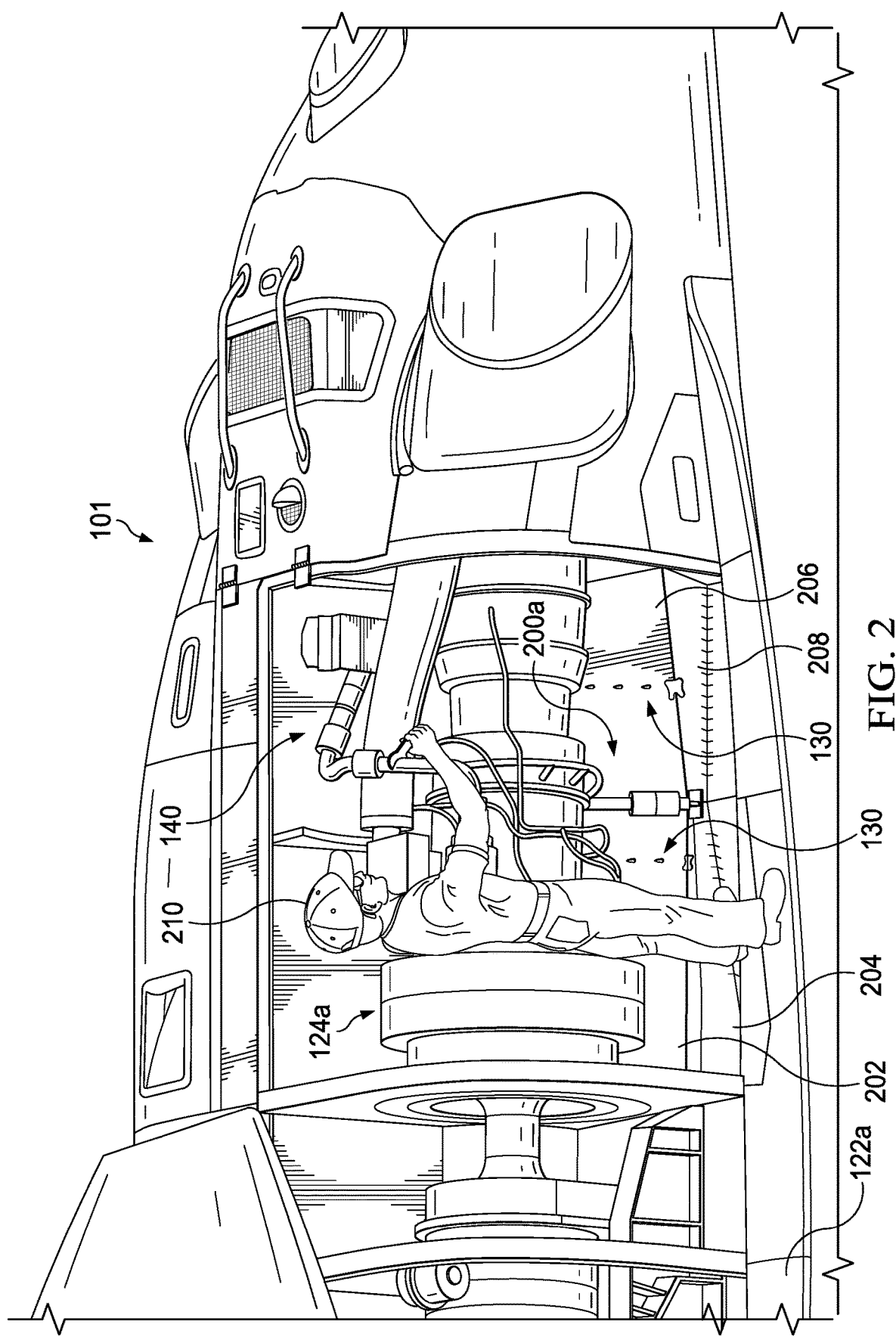
FIG. 2 is a cutaway view of the aircraft of FIGS. 1A, 1B, and 1C showing a liquid drainage system in accordance with some embodiments of the present disclosure.

FIG. 2 is view of the rotorcraft 101 illustrating foot traffic in and around the compartment 140. FIG. 2 shows a point of view as generally indicated by the arrows labeled "2" in FIG. 1C. A person 210 is accessing the compartment 140 while standing on the track 122a and on the liquid drainage system 200a. The liquid drainage system 200b is substantially symmetric to the liquid drainage system 200a. Only for the sake of brevity, certain features will be discussed with respect to the liquid drainage system 200a. However, one of ordinary skill in the art will fully appreciate an understanding of the liquid drainage system 200b based upon the disclosure herein of the liquid drainage system 200a.

The liquid drainage system 200a includes drain sheets 202 and 206 and drain pans 204 and 208. The person 210 is standing with one foot on the track 122a and the other foot on the drain pan 204. The person 210 accessing the compartment can potentially damage the liquid drainage system 200a. For example, step loads imposed directly by the person 210, abrasions, and/or impact loads caused by the person 210 dropping items (e.g., tools, replacement parts, and the like) may cause such damage. The damage can include, for example, gouges in, deformations in, scratches in, and/or thinning of the drain sheets 202 and 206 and/or drain pans 204 and 208. Such damage could diminish the ability of the liquid drainage system 200a to collect and/or transfer liquid 130 away from the compartment 140 and/or could reduce the structural integrity and/or fatigue life of the drain sheets 202 and 206 and/or drain pans 204 and 208.

A potential solution is to manufacture the parts from metal, which can potentially withstand such damage. However, doing so could increase the complexity of the manufacturing process especially for drain sheets 202 and 206 and/or drain pans 204 and 208, which can have complex geometry. For example, using metal may require: expensive manufacturing equipment to press shapes into metal, a manual process of forming a complex shape, and/or manually welding different pieces together to achieve a complex shape. Accordingly, there is a need for a non-metal solution capable of withstanding extreme temperatures and/or fire, supporting foot traffic, and able to be manufactured into complex three-dimensional shapes all while keeping low manufacturing costs.

A solution disclosed herein addresses the above challenges (and others) and includes a liquid drainage system made from a composite material that is not only able to support step loads but also able to guide flow of engine fluids from a reservoir to a drain. The embodiments described throughout this disclosure provide numerous technical advantages including that a liquid drainage system is integrated with a reservoir which also serves as walking surface with structural capacity for supporting step loads. Example embodiments that may be used to guide flow of liquids and support step loads are described below with more particular reference to the remaining Figures.

FIG. 3 illustrates further details of the drain pan 204 of FIG. 2, in accordance with some embodiments of the present disclosure. The drain pan 204 comprises a composite material, which includes a polymeric resin and a reinforcing fiber. The composite material forms a reservoir 480, a drain 410, and a flange 408 of the drain pan 204. The reservoir 480 includes a sidewall 442, curved portions 402 and 404, sloped portions 406 and 414, and a crest region 416. The various portions of the reservoir 480 guide flow of the liquid to the drain 410. The reservoir 480 can catch a liquid from an engine such as the engine 124a of FIG. 2 and can hold a quantity of the liquid. In addition, the reservoir 480 can support a step load from a person such as the person 210 of FIG. 2. The drain 410 drains the liquid from the reservoir 480.

Figure 4A:
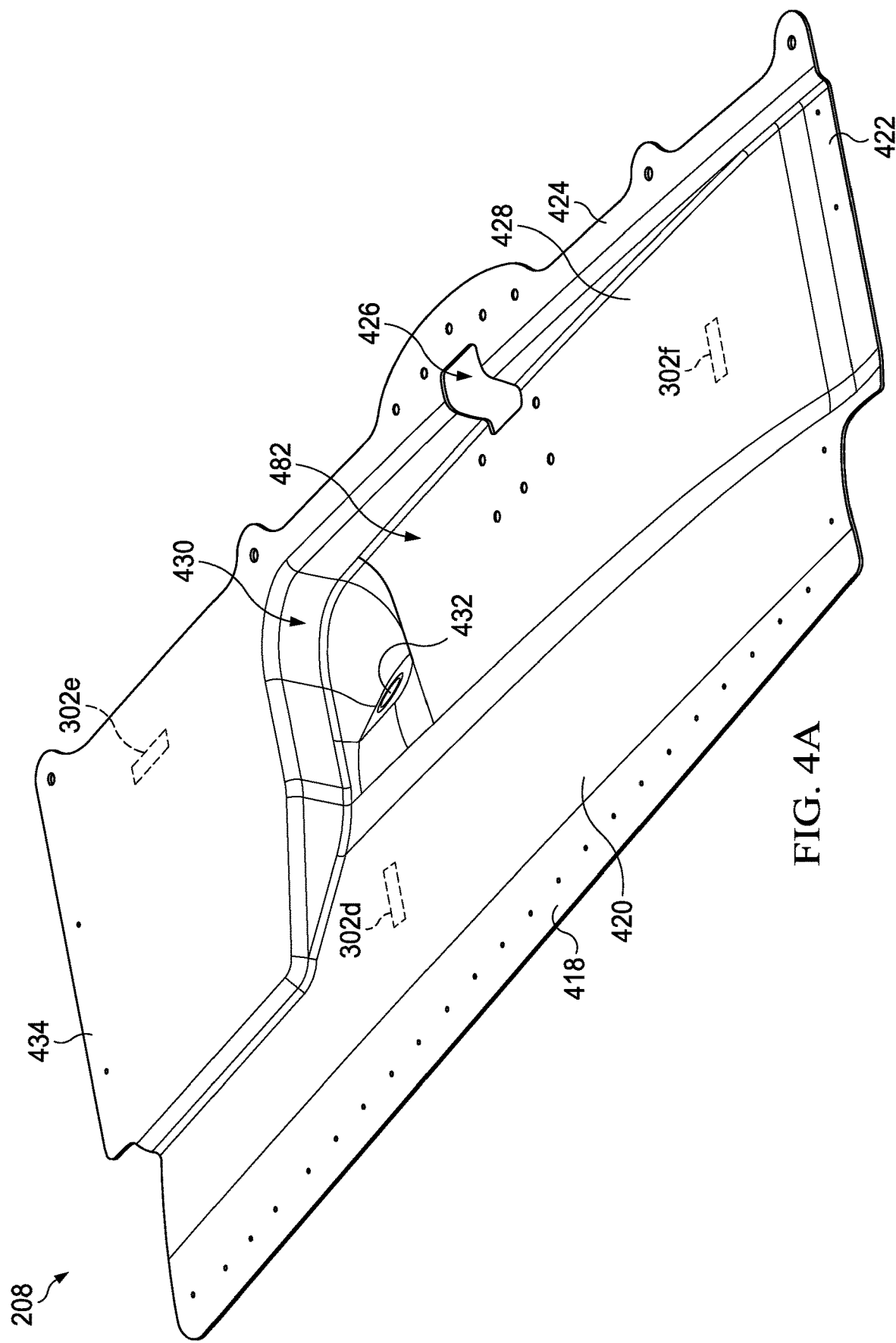
Figure 4B:
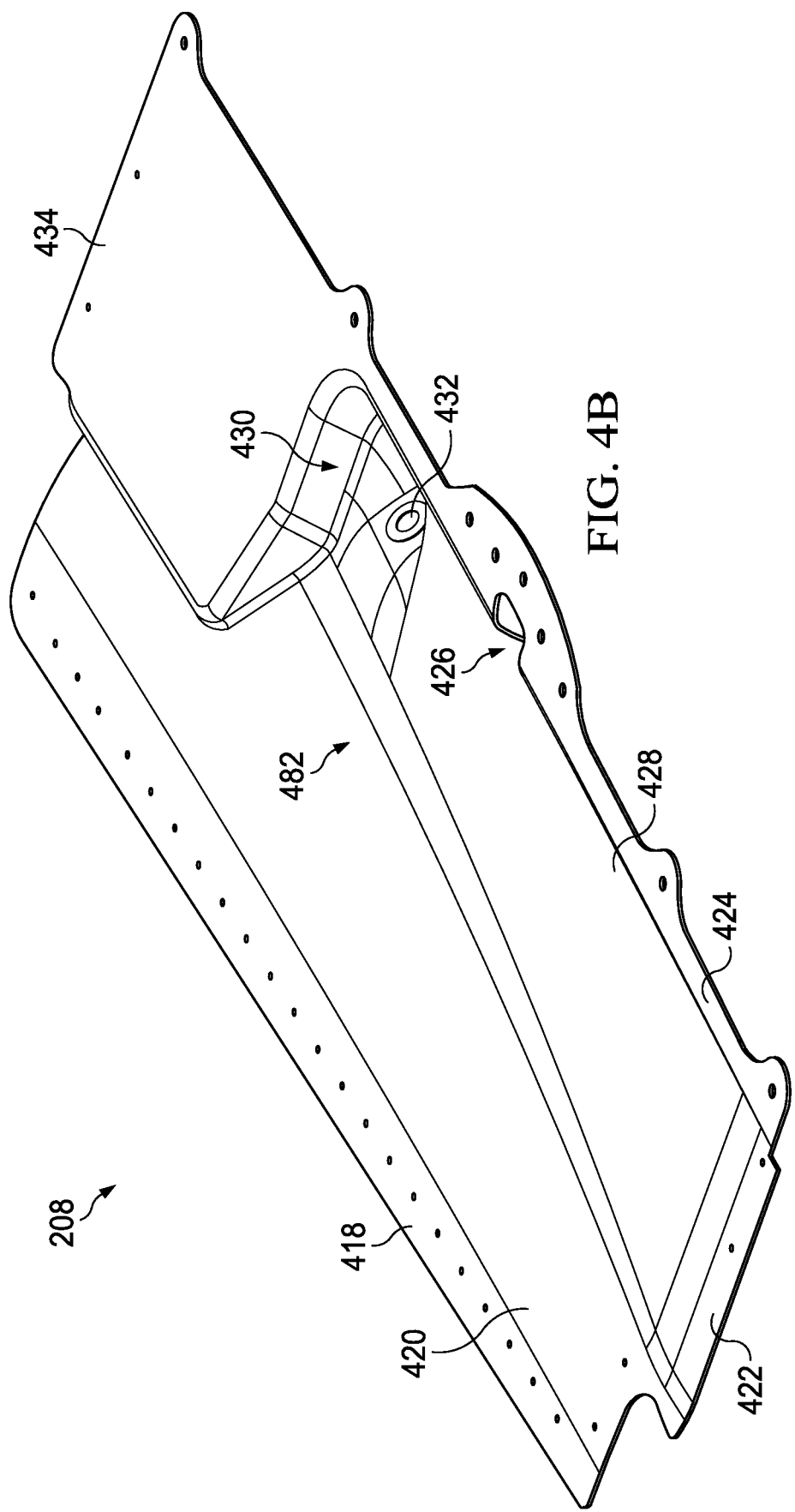

FIGS. 4A and 4B illustrate further details of the drain pan 208 of FIG. 2, in accordance with some embodiments of the present disclosure. The drain pan 208 comprises a composite material, which includes a polymeric resin and a reinforcing fiber. The composite material forms a reservoir 482, a drain 432, and a flange 424 of the drain pan 208. The reservoir 482 includes a raised portion 434, a curved portion 420, a sloped portion 428, a well 430, and a crest region 416. The various portions of the reservoir 482 guide flow of the liquid to the well 430 and the drain 432. The reservoir 482 can catch a liquid from an engine such as the engine 124a of FIG. 2 and can hold a quantity of the liquid. In addition, the reservoir 482 can support a step load from a person such as the person 210 of FIG. 2. The drain 432 drains the liquid from the reservoir 482.

Edges of the drain pans 204 and 208 align and mate with the fairing 121a of the FIGS. 1A, 1B, and 1C to control the flow of liquids into the drain pans 204 and 208. Liquid from a component may be propelled outward from the component within the compartment 140 while the fairing 121a is closed. For example, a liquid may be expelled in a radial direction with respect to a centerline of an engine. In such an example, the liquids may collect on an inner surface of the fairing 121a and drip down along the inner surface. If the edges of the drain pans 204 and 208 were located inboard relative to the fairing 121a, any liquids dripping down along the inner surface fairing 121a could spill outside of the compartment 140 and reach potentially unintended and unsafe locations outside of the fire zone. If the edges of the drain pans 204 and 208 were located outboard relative to the fairing 121a, the drain pans 204 and 208 could, for example, erroneously capture large quantities of rain water which may reduce the overall capability of the drainage system to drain liquids originating from the compartment 140. Advantageously, because the edges of the drain pans 204 and 208 align with the contour of the fairing 121a as it changes along a length of the rotorcraft 101, the drain pans 204 and 208 can capture and control the flow of liquids origination from within the compartment 140.

The shape of the reservoirs 480 and 482 (of the drain pans 204 and 208, respectively) are a complex shape as is further described below with respect to FIGS. 8, 9, 10, and 11. Advantageously, the drain pans 204 and 208 being formed from the composite material enables them to be manufactured into such a complex shape, withstand extreme temperatures (e.g., based on a fire-resistance of the epoxy and/or a coating thereon), and support foot traffic (based on a bending strength of the composite material) while remaining relatively light an thin (e.g., based on a high strength to weight ratio of the composite material). The cross-section areas 302a, 302b, and 302c on the drain pan 204 of FIG. 3 and the cross-section areas 302d, 302e, and 302f on the drain pan 208 of FIGS. 4A and 4B illustrate exemplary areas from which the cross section of FIGS. 5A, 5B, 6A, and/or 6B are shown. Each of the drain pans 204 and 208 comprise a single, continuous sheet of the composite material to form the respective reservoirs and drains. In some embodiments, each of the drain pans 204 and 208 has a constant cross section. Though the cross section may vary slightly in dimension (e.g., variations in thickness due to manufacturing tolerances), the cross section is constant in that its material makeup does not change. The drain pans 204 and 208 maintain the same cross-sectional makeup and composite material through the entire drain pan. Thus, for each drain pan, the cross sections match one another across the entire drain pan. For example, the composite material in each of the cross-section areas 302a, 302b, and 302c on the drain pan 204 are the same. Likewise, the composite material in each of the cross-section areas 302d, 302e, and 302f on the drain pan 208 are the same. In other embodiments, the composite material varies in cross section over the drain pans 204 and 208. In such embodiments, the composite material in each of the cross-section areas 302a, 302b, and 302c on the drain pan 204 may be different (e.g., with a stronger composite material being placed at locations that are expected to receive more load than others). Similarly, the composite material in each of the cross-section areas 302d, 302e, and 302f on the drain pan 208 may be different.

Figure 5A:
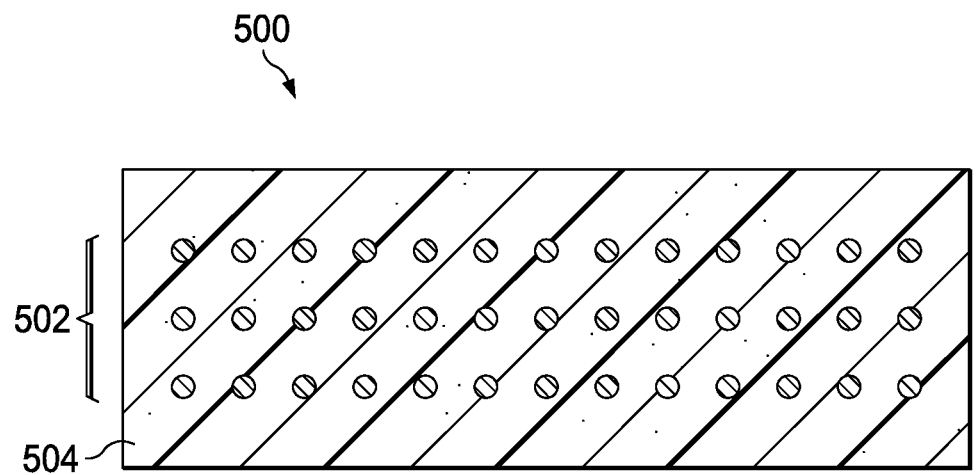
FIGS. 5A, 5B, 6A, and 6B illustrate cross sections of a drain pan, in accordance with some embodiments of the present disclosure.
Figure 5B:
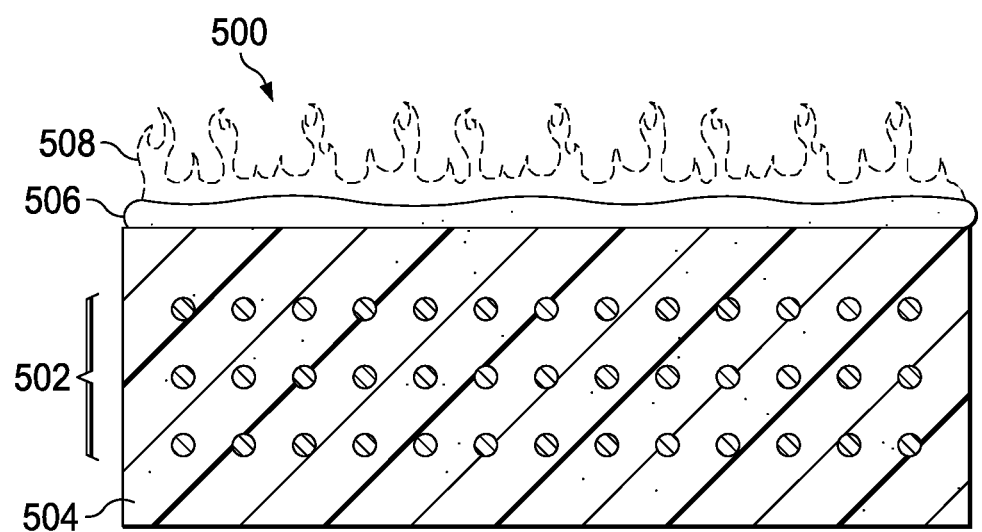

FIGS. 5A and 5B illustrate cross sections of a composite material 500, which forms a drain pan in accordance with some embodiments of the present disclosure. The composite material 500 includes a polymeric resin 504 and reinforcing fibers 502. The reinforcing fibers 502 may form a sheet of reinforcing fibers, which is suspended in the polymeric resin 504. The composite material 500 is non-metallic and, therefore, does not contain metal. The polymeric resin 504 may include a Bismaleimide (BMI) resin, an epoxy (epoxide) resin, a thermosetting polymer, and/or any other polymer. The reinforcing fibers 502 may include carbon fiber, glass fiber, and/or other fibers. Drain pans of the present disclosure guide the flow of liquids from an engine to a drain. For example, FIG. 5B illustrates the composite material 500 of FIG. 5A supporting a liquid 506, which flows across a surface of the composite material 500. Because drain pans of the present disclosure can capture the liquid 506 from an engine and/or another flight control system, the liquid 506 may be at a temperature of about 1500 degrees Fahrenheit and/or may be flammable. As an example, the liquid 506 may include one or more of a petroleum-based fuel such as jet fuel, turbine fuel, gasoline, and the like; a heat-transfer fluid such as a coolant or refrigerant; a hydraulic fluid; and/or a lubricant. The liquid 506 may be at such temperatures due to absorbing heat from an engine and/or other system components. In some cases, when the liquid 506 is flammable, the liquid 506 may ignite and fuel a fire 508. Advantageously, the composite material 500 can withstand the fire 508 burning at about 2000 degrees Fahrenheit for at least 15 minutes and still remain operable to drain the liquid 506. For example, the drain pan on which the composite material 500 is deployed can continue to catch liquid from the engine in a reservoir and continue to drain the liquid from the reservoir through a drain during the fire 508. In some embodiments, a fire-resistant material coats a portion of the composite material 500.

Figure 6A:
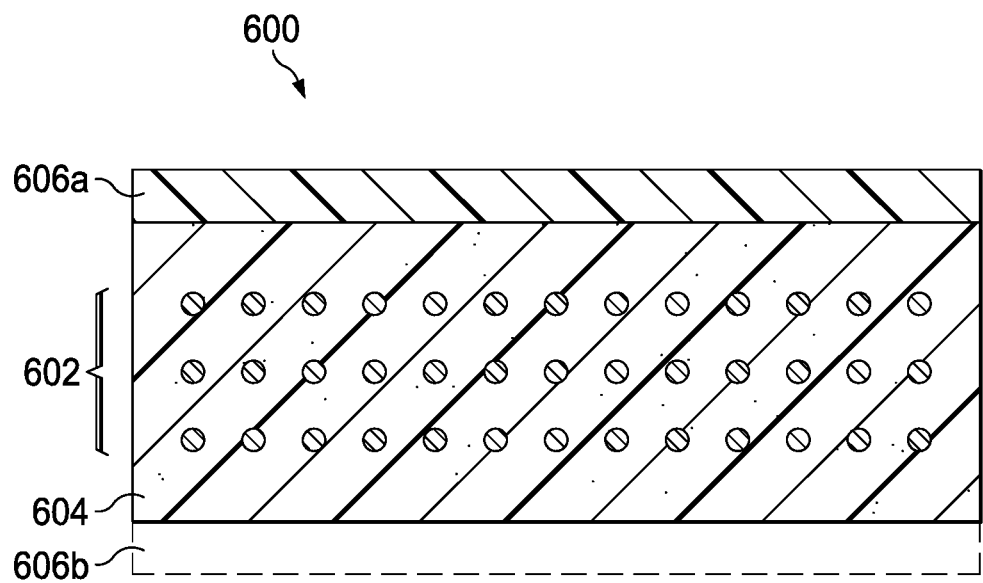
Figure 6B:
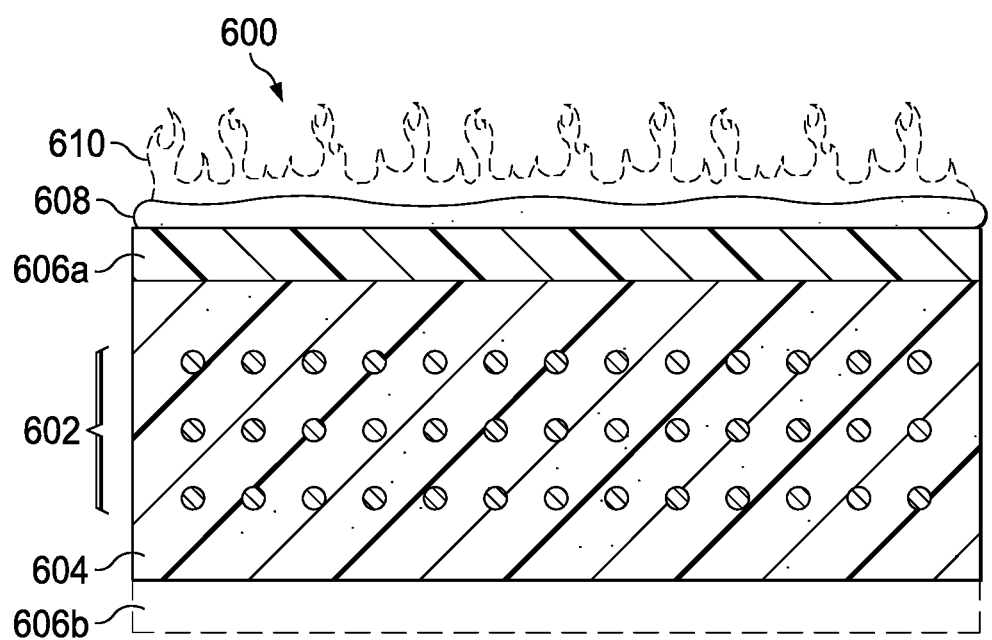

FIGS. 6A and 6B illustrate cross sections of a composite material 600 and a fire-resistant material 606, which form a drain pan in accordance with some embodiments of the present disclosure. FIG. 6A illustrates a cross section of the composite material 600, which includes a polymeric resin 604 and reinforcing fibers 602. The composite material 600 of FIGS. 6A and 6B is similar to (but not necessarily identical to) the composite material 500 of FIGS. 5A and 5B, the details of which are not repeated here only for the sake of brevity. A difference between the composite material 500 of FIGS. 5A and 5B and the composite material 600 of FIGS. 6A and 6B is that the composite material 600 is coated by the fire-resistant material 606. Layers of the fire-resistant material 606 coat one or more surfaces of the composite material 600. The fire-resistant material layer 606a can coat a top surface of the composite material 600. The fire-resistant material layer 606b can coat a bottom surface of the composite material 600. The fire-resistant material 606, which forms the fire-resistant material layers 606a and 606b, increases the fire-resistance of the composite material 600 and any drain pan formed from the composite material 600. Because drain pans of the present disclosure support step loads, the fire-resistant material 606 also supports step loads. In some embodiments, the fire-resistant material 606 includes a silicon rubber-based coating. A silicon rubber-based coating is flexible and therefore not prone to fracture (e.g., crack, chip, and/or flake) when the composite material 600 bends to support the step loads. In addition, some gaps such as those caused by tolerances in mating parts, if left unsealed, may serve as a pathway for liquids, vapor, and/or fire to spread between adjacent compartments. Another advantage of a silicon rubber-based coating is that its flexibility enables it to act as a sealant for these gaps and can create a fluid-tight seal at joints in mating parts and at fastener installation locations.

The fire-resistant material 606 coats at least a portion of the drain pan formed from the composite material 600. For example, the fire-resistant material 606 may be applied to the composite material 600 before the drain pan is installed on an aircraft. Pre-installation application of the fire-resistant material 606 can enable selective application to one or more sides of the composite material 600. For example, only the fire-resistant material layer 606a is applied, only the fire-resistant material layer 606b is applied, or both the fire-resistant material layer 606a and the fire-resistant material layer 606b are applied. Alternatively, the fire-resistant material 606 may be applied to the composite material 600 after the drain pan is installed on the aircraft for example, by selectively applying the fire-resistant material 606 to exposed portions of the composite material 600.

The fire-resistant material 606 increases the overall fire-resistance of the reinforcing fibers 602 by reflecting radiant heat energy. In addition, the fire-resistant material 606 lowers the total heat transfer capability across the entire cross section (i.e., the fire-resistant material layer 606a, the reinforcing fibers 602, and the fire-resistant material layer 606b, where applicable). Increasing the fire-resistance and lowering the heat transfer capability is particularly important, for example, when the drain pan is located between a structural support element, such as a beam or joist, and a source of radiant heat. The source of radiant heat may include an engine, an engine exhaust system, or a fire. The reinforcing fibers 602, which form the drain pan, as well as any coatings such as the fire-resistant material 606, serve as a thermal insulator to protect the structural support element from potential damage caused by the fire.

FIG. 6B illustrates the composite material 600 and the fire-resistant material 606 of FIG. 6A supporting a liquid 608, which flows across a surface of the composite material 600. Because drain pans of the present disclosure can capture the liquid 608 from an engine and/or another flight control system, the liquid 608 may be at a temperature of about 1500 degrees Fahrenheit and/or may be flammable. The liquid 608 of FIG. 6B is similar to the liquid 506 of FIG. 5A, the details of which are not repeated here only for the sake of brevity. Advantageously, the combination of the composite material 600 and the fire-resistant material 606 can withstand a fire 610 burning at about 2000 degrees Fahrenheit for at least 15 minutes and still remain operable to drain the liquid 608. In some embodiments, the cross-section areas 302a, 302b, 302c, 302d, 302e, and 302f of the drain pans 204 and 208 of FIGS. 3, 4A, and 4B comprise the cross section as illustrated in FIGS. 5A and 5B or the cross section as illustrated in FIGS. 6A and 6B.

The cross sections in FIGS. 5A and 5B and FIGS. 6A and 6B can withstand a fire burning at about 2000 degrees Fahrenheit for at least 15 minutes and still remain operable to drain liquid. One difference is that the composite material 500 of FIGS. 5A and 5B is able to withstand such conditions alone while the composite material 600 of FIGS. 6A and 6B may require the addition of the fire-resistant material 606 to withstand such conditions. As an example, when the polymeric resin 504 of the composite material 500 includes BMI resin, the composite material 500 alone may withstand the fire burning at 2000 degrees Fahrenheit for at least 15 minutes. As another example, when the polymeric resin 604 of the composite material 600 includes an epoxy resin, the composite material 600 alone may withstand the fire burning at 2000 degrees Fahrenheit for at least 5 minutes. The fire-resistant material 606, such as one including silicon rubber, can ensure that a drain pan made of a combination of the composite material 600 and the fire-resistant material 606 can withstand the fire burning at 2000 degrees Fahrenheit for at least 15 minutes. The addition of the fire-resistant material 606 can increase the fire-resistance of the composite material 600 of the drain pan.

Figure 7:
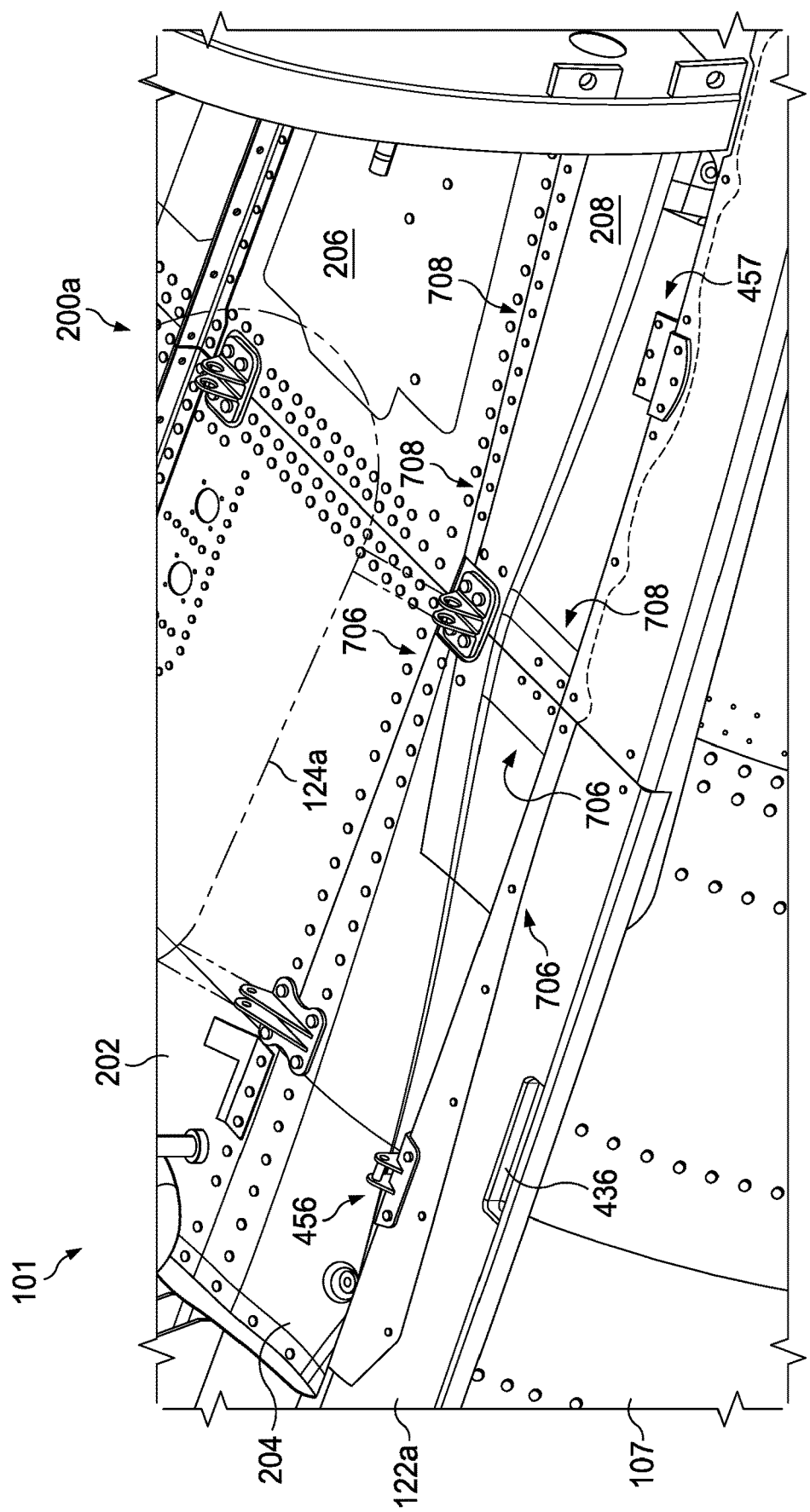
FIG. 7 is a cutaway view of the aircraft of FIGS. 1A, 1B, and 1C showing a liquid drainage system in accordance with some embodiments of the present disclosure.

FIG. 7 illustrates further details of the drain pans 204 and 208 in the context of the liquid drainage system 200a, in accordance with some embodiments of the present disclosure. The liquid drainage system 200a includes drain sheets 202 and 206 and the drain pans 204 and 208. The drain sheets 202 and 206 and the drain pans 204 and 208 guide flow of liquids to a drain (e.g., during operation of the engine 124a), support a step load (e.g., during maintenance in an around the compartment 140), and withstand extreme temperatures. Fasteners attach the drain sheets and the drain pans to the fuselage 107. For example, fasteners 706 are located around a perimeter of the drain pan 204 and attach the drain pan 204 to the fuselage 107. Fasteners 708 are located around a perimeter of the drain pan 208 and attach the drain pan 208 to the fuselage 107. The fasteners 706 and 708 are fire-resistant and may comprise materials such as titanium and/or corrosion resistant steel. Latch fittings 456 and 457 are attached to the drain pans 204 and 208, respectively, and provide a fixed location to which the fairing 121a of the FIGS. 1A, 1B, and 1C can attach when in the closed position. The track 122a includes a handhold 436, which a person can grasp to help reach the elevation of the track 122a.

Figures 8, 9:
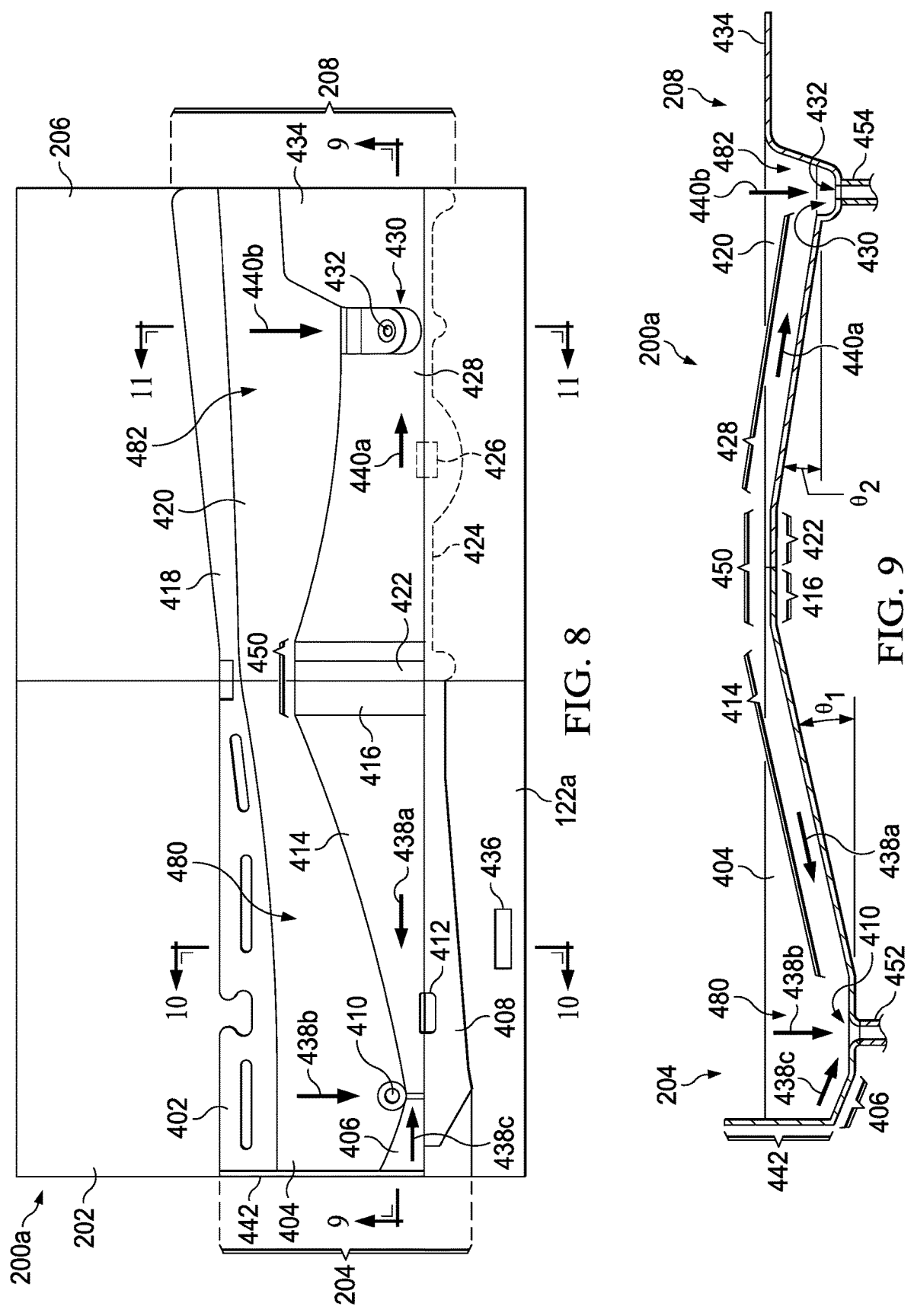
Figure 10:
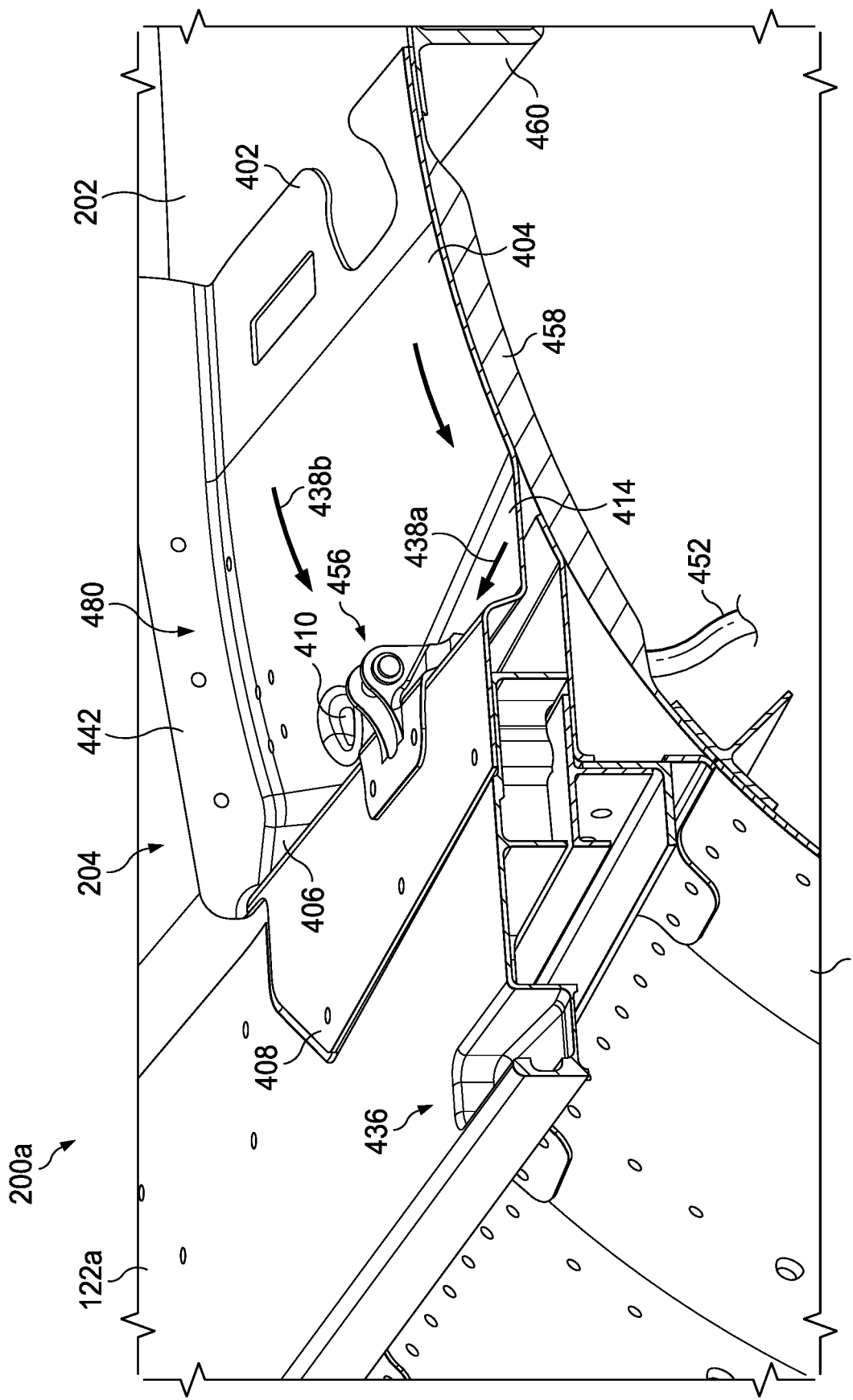
Figure 11:
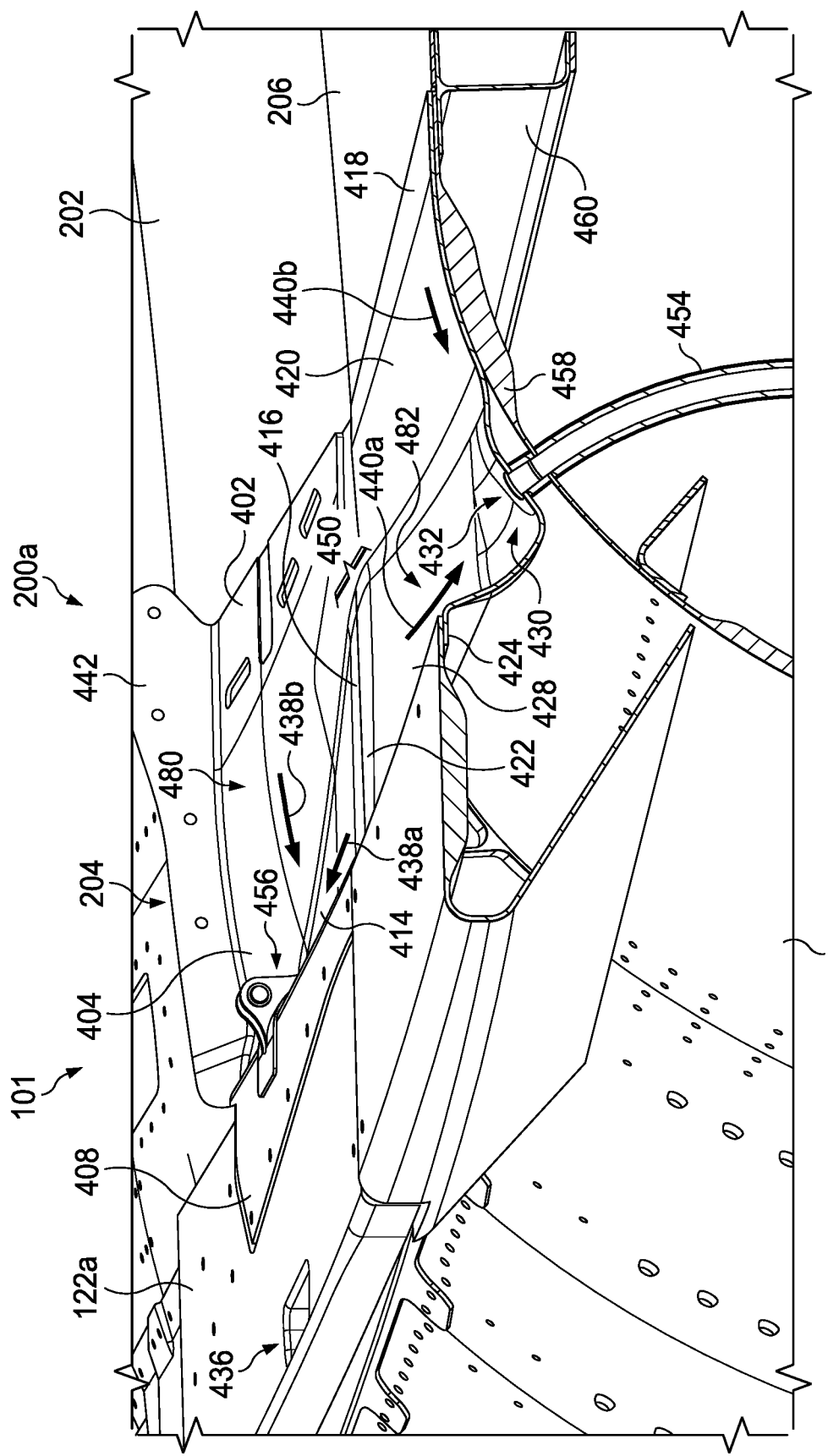

FIGS. 8, 9, 10, and 11 illustrate further details of several components of the liquid drainage system 200a, in accordance with some embodiments of the present disclosure. FIG. 8 is a top view of the liquid drainage system 200a on the rotorcraft 101. FIG. 9 is a section view through the drain pans 204 and 208 of the liquid drainage system 200a as generally indicated by the arrows labeled "9" in FIG. 8. FIG. 10 is a section view through the drain pan 204 of the liquid drainage system 200a as generally indicated by the arrows labeled "10" in FIG. 8. FIG. 11 is a section view through the drain pan 208 of the liquid drainage system 200a as generally indicated by the arrows labeled "11" in FIG. 8. The following description of the drain pans 204 and 208 makes simultaneous reference to reference numbers in each of the FIGS. 8, 9, 10, and 11.

The drain pan 204 includes a composite material, which forms a reservoir 480, a drain 410, and a flange 408. The reservoir 480 includes a sidewall 442, curved portions 402 and 404, sloped portions 406 and 414, and crest region 416. The shape of the reservoir 480 is a complex shape, which includes some portions that slope toward the drain 410 at a constant slope and other portions that curve toward the drain 410 and have a varying slope. The sloped portions 406 and 414 slope toward the drain 410 at a constant slope. For example, the sloped portion 414 slopes at an angle of $\theta_1$, as illustrated in FIG. 9. The curved portions 402 and 404 are curved to match a curve of the fuselage 107, e.g., as illustrated in FIG. 10. The curved portions 402 and 404 have a varying slope, which creates the curvature. The curvature of the curved portions 402 and 404 matching the curvature of the fuselage 107 enables them to rest flush upon the fuselage 107 and to direct flow of any liquids from the reservoir 480 to the drain 410. In some examples, the curved portions 402 and 404 include a three-dimensional curvature wherein the slope varies in each of three perpendicular axes to create a smooth surface. In other examples, the curved portions 402 and 404 include a quadratic surface such a portion of an ellipsoid (e.g., to match the shape of the fuselage 107). Such complex shapes can be challenging to manufacture using metal and could require expensive equipment or an extended manual process involving, e.g., welding multiple metal pieces to one another. The drain pan 204 and the drain pan 208 abut one another and form a crest 450 from which the liquid can flow into the drain pan 204 and/or the drain pan 208. The crest region 416 forms a portion of the crest 450.

On the drain pan 204, the curved portions 402 and 404 and the sloped portions 406 and 414 of the reservoir 480 help guide flow of the liquid to the drain 410. Flow directions 438a, 438b, and 438c illustrate example liquid flows to the drain 410. The sloped portions 406 and 414 slope along a first axis (e.g., parallel to the flow directions 438a and 438c); the curved portions 402 and 404 curve along a second axis (e.g., parallel to the flow direction 438b). The first axis and the second axis are perpendicular to one another. The sloped portions and curved portions being oriented perpendicular to one another draws the liquid to a central area around the drain 410. A tube 452 is coupled to the drain 410. The tube 452 transfers the liquid from the drain 410 to an outlet such as the outlet 128a of FIG. 1C.

The flange 408 of the drain pan 204 overlaps and is supported on top of the track 122a. The drain pan 204 is made from the composite material and can support step loads such as that received from foot traffic. A top surface of the flange 408 is flush with the track to prevent creating a trip hazard for people walking on the track 122a and/or the reservoir 480. The drain pan 204 transfers the step loads to the fuselage 107. The fuselage 107 includes a reinforced portion 458 that supports the loads received from the drain pan 204 and transfers the loads to a structural member 460. The flange 408 includes an opening 412 (FIG. 8) over which the latch fitting 456 (FIGS. 9 and 10) is attached to the drain pan 204. In some examples, a fairing such as fairing 121a of FIGS. 1A, 1B, and 1C may lock into a closed position by locking around a portion of the latch fitting 456.

The drain pan 208 includes a composite material that forms a reservoir 482, a drain 432, and a flange 424. The reservoir 482 includes a raised portion 434, curved portions 418 and 420, a sloped portion 428, a well 430, and a crest region 416. The shape of the reservoir 482 is a complex shape, which includes some portions that slope toward the drain 432 at a constant slope and other portions that curve toward the drain 432 and have a varying slope. The sloped portion 428 slopes toward the drain 423 at a constant slope. As illustrated in FIG. 9, the sloped portion 428 slopes at an angle of $\theta_2$. The curved portions 418 and 420 are curved to match a curve of a fuselage 107, e.g., as illustrated in FIG. 11. The curved portions 418 and 420 have a varying slope, which creates the curvature. The curvature of the curved portions 418 and 420 matching the curvature of the fuselage 107 enables them to rest flush upon the fuselage 107 and to direct flow of any liquids from the reservoir 482 to the drain 432. In some examples, the curved portions 418 and 420 include a three-dimensional curvature wherein the slope varies in each of three perpendicular axes to create a smooth surface. In other examples, the curved portions 418 and 420 include a quadratic surface such a portion of an ellipsoid. The crest region 422 forms a portion of the crest 450.

On the drain pan 208, the curved portions 418 and 420 and the sloped portion 428 of the reservoir 482 help guide flow of the liquid into the well 430 from which it flows to the drain 432. Flow directions 440a and 440b illustrate example liquid flows toward the well 430 and the drain 432. The sloped portion 428 slopes along a first axis (e.g., parallel to the flow direction 440a); the curved portions 418 and 420 curve along a second axis (e.g., parallel to the flow direction 440b). The first axis and the second axis are perpendicular to one another. The sloped portion and curved portions being oriented perpendicular to one another draws the liquid to the well 430 around the drain 432. A tube 454 is coupled to the drain 432 and transfers the liquid from the drain 432 to an outlet such as the outlet 128a of FIG. 1C.

The flange 424 of the drain pan 208 underlaps and supports a portion of the track 122a. The drain pan 208 can not only directly support step loads but also provides some support for indirect step loads received from the track 122a. The drain pan 208 is made from the composite material that can support the step loads. The drain pan 208 transfers the step loads to the fuselage 107. The reinforced portion 458 of the fuselage 107 supports the loads received from the drain pan 208 and transfers the loads to the structural member 460 as shown in FIG. 11. The flange includes an opening 426 (FIG. 8) over which the latch fitting 457 (FIG. 7) is attached to the drain pan 208. In some examples, a fairing such as the fairing 121a of FIGS. 1A, 1B, and 1C may lock into a closed position by locking around a portion of the latch fitting 457.

Figure 12:
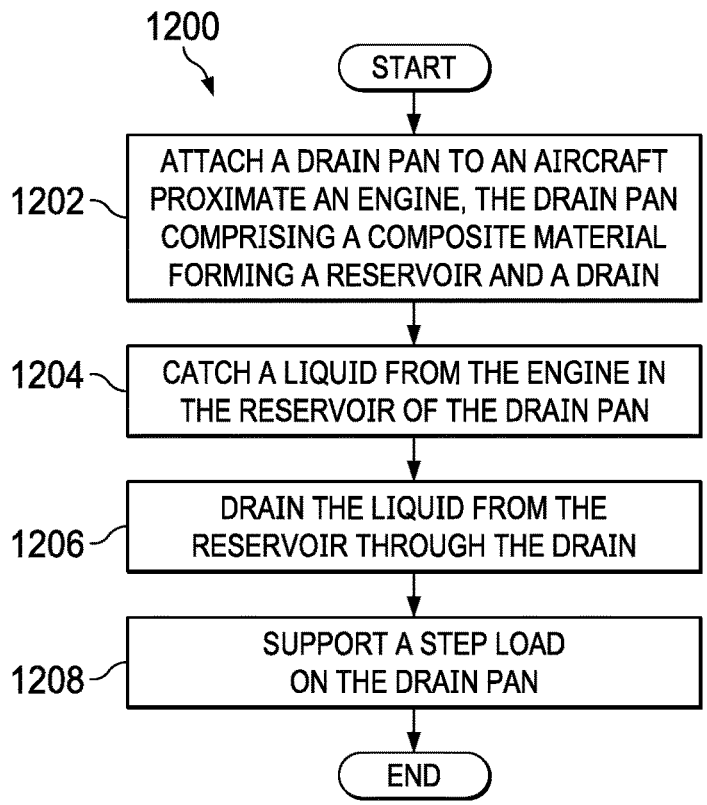
FIG. 12 illustrates a method of using a drain pan, in accordance with some embodiments of the present disclosure.

FIG. 12 illustrates a method 1200 of using a drain pan, in accordance with some embodiments of the present disclosure. The method 1200 may begin at 1202 by attaching a drain pan to an aircraft proximate an engine, the drain pan comprising a composite material forming a reservoir and a drain. In some embodiments, the drain pan is non-metallic, and the composite material lacks metal. The method 1200, in some embodiments, includes coating at least a portion of the drain pan with a fire-resistant material. The fire-resistant material can increase a fire-resistance of the drain pan by 25% or more. At 1204, a liquid is caught from the engine in the reservoir of the drain pan. In some examples, the liquid is expelled from the engine and is collected in the reservoir. The liquid may be at a temperature greater than 1500 degrees Fahrenheit. In addition, the liquid may be flammable. For example, the liquid may be a petroleum-based fuel, a coolant, a hydraulic fluid, and/or a lubricant. At 1206, the drain drains the liquid from the reservoir. The liquid may be transferred from the drain to an outlet through a tube coupled to the drain. The method 1200 can also include receiving, for a duration of at least 15 minutes, a fire burning at about 2000 degrees Fahrenheit on the drain pan; while simultaneously receiving the fire, the drain pan can continue to catch the liquid from the engine in the reservoir of the drain pan and continue to drain the liquid from the reservoir through the drain. In some examples, due to the fire-resistance of the drain pan, the drain pan acts as a barrier to contain a fire in an engine zone and prevents the fire from spreading to other areas of the aircraft. At 1208, a step load is supported by the reservoir of the drain pan. The step load may be received from a person performing a maintenance activity nearby the drain pan. In some embodiments, one or more portions of the method 1200 may repeat, e.g., in a loop. The start and or end of the method 1200 may coincide with a start and/or end of other methods.

Figure 13:
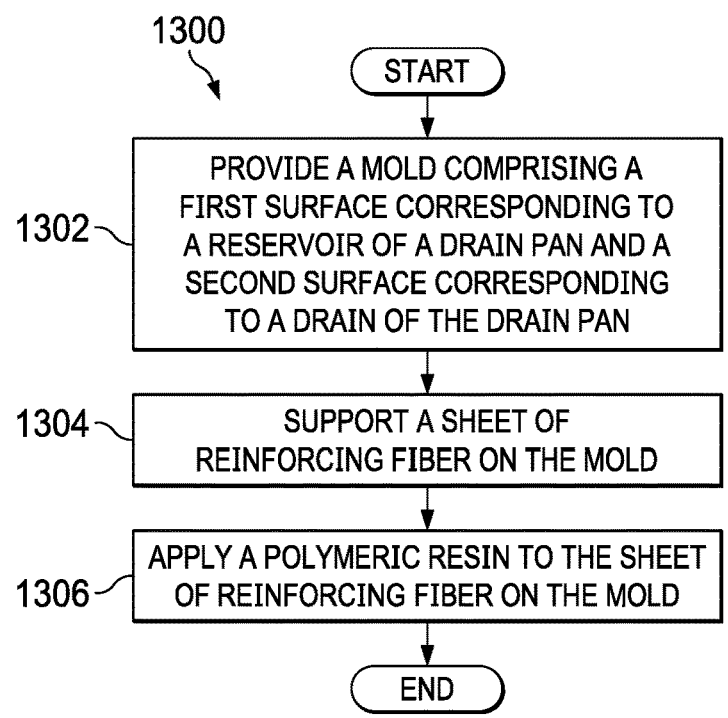
FIG. 13 illustrates a method of producing a drain pan, in accordance with some embodiments of the present disclosure.

FIG. 13 illustrates a method of producing a drain pan, in accordance with some embodiments of the present disclosure. The method 1300 may begin at 1302 by providing a mold comprising a first surface corresponding to a reservoir and second surface corresponding to a drain. The first surface and the second surface can include concave and/or convex portions such as recessions and/or protrusion to form a structure for the reservoir and the drain. In some embodiments, the method 1300 includes manufacturing the mold from a stock material. The mold may include a support structure and/or frame manufactured from the stock material. The mold may be manufactured based on removal of material (e.g., by machining), addition of material (e.g., layer-by-layer deposition of material onto a substrate such as 3D printing), molding a solid material (e.g., pressing a flat sheet of material into conformance with a desired shape), and/or molding a fluid material in into conformance with a desired shape (e.g., injection molding). At 1304, a sheet of reinforcing fiber is supported on the mold. The sheet of reinforcing fiber may be draped, fixed, or held in place on the mold. In some examples, the mold comprises two moveable parts between which the sheet of reinforcing fiber is held. The sheet may include a woven material such as woven carbon fiber or woven glass fiber. At 1306, a polymeric resin is applied to the sheet of reinforcing fiber on the mold. In some embodiments, the application of the polymeric resin to the sheet of reinforcing fiber generates a drain pan from a composite material comprising the polymeric resin and the sheet of reinforcing fiber. In such embodiments, the drain pan comprises the reservoir and the drain formed from the composite material based on the first surface and the second surface, respectively. In some embodiments, the mold comprises a cavity and the polymeric resin is injected into the cavity in the mold such as in an injection molding operation. In some embodiments, one or more portions of the method 1300 may repeat, e.g., in a loop. The start and or end of the method 1300 may coincide with a start and/or end of other methods.

Several embodiments of the present disclosure utilize a certain number of members, such as drains, reservoirs, sloped portions, curved portions, drain pans, and the like to integrate various features into a liquid drainage system. However, embodiments of the present disclosure are not limited to the specific number of members in the illustrated embodiments. The number of members can vary between different embodiments. For example, some embodiments may be implemented using more, less, and/or other member than those illustrated in the Figure. Moreover, some embodiments may consolidate two or more of the members into a single member. In addition, several embodiments of the present disclosure refer to and show fasteners. The material composition of the fasteners be fire-resistance as described herein and may comprise, titanium, steel, and/or a metal alloy. Such fasteners are inclusive of screws, nuts, bolts, welds or any other mechanical fasteners for attaching two or more components to one another.

It is noted that the term "fire-resistant" (and variants such as or "fire resistant" and "fire-resistance") can refer to degree to which (e.g., based on an amount of time) a material or composition of materials can withstand a fire burning at a specified temperature without failure. Some elements may be more fire-resistant than other elements based on the relative amount of time each element can withstand the fire burning at the specified temperature. The Federal Aviation Administration (FAA) issued, on Aug. 3, 2009, an Advisory Circular (AC) number AC 33.17-1A titled "Engine Fire Protection," (herein after referred to as "AC 33.17-1A") which provides, among other things, definitions associated with the engine fire protection requirements of Title 14 of the Unites States Code of Federal Regulations, subsection 33.17. For example, AC 33.17-1A defines, in part, that "Fire Resistant" is a capability of a part to withstand a 2000 degrees Fahrenheit average flame temperature (±150 degrees Fahrenheit individual thermocouple tolerance) for a minimum of 5 minutes. In addition, AC 33.17-1A defines, in part, that "Fireproof" is a capability of a part to withstand a 2000 degrees Fahrenheit average flame temperature (±150 degrees Fahrenheit individual thermocouple tolerance) for a minimum of 15 minutes while still performing its intended function while exposed to a fire. Fire-resistance, as referred to herein, can include a material or component with capabilities equal to "Fire Resistant" and/or "Fireproof" as defined by AC 33.17-1A. In addition, drain pans of the present disclosure can prevent accumulation of a flammable liquid to a "Hazardous Quantity" as defined by AC 33.17-1A.

Although several embodiments have been illustrated and described in detail, numerous other changes, substitutions, variations, alterations, and/or modifications are possible without departing from the spirit and scope of the present disclosure, as defined by the appended claims. The embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An aircraft comprising:
an engine; and
a drain pan comprising:
a composite material comprising a polymeric resin and a reinforcing fiber, wherein the composite material forms:
a reservoir to catch a liquid from the engine,
a drain to drain the liquid from the reservoir,
a flange for supporting a step load on an external portion of the aircraft,
wherein the drain pan is operable to withstand a fire burning at about 2000 degrees Fahrenheit for at least 15 minutes, and
wherein the reservoir formed by the composite material comprises:
a sloped portion sloping toward the drain at a constant slope along a first direction; and
a curved portion sloping toward the drain at a varying slope along a second direction, wherein the first direction and the second direction are perpendicular to one another.

2. The aircraft of claim 1, further comprising:
a fire-resistant material coating the composite material.

3. The aircraft of claim 1, wherein the drain pan is a first drain pan and further comprising a second drain pan, and
wherein the first drain pan and the second drain pan abut one another and form a crest from which the liquid can flow into the first drain pan and the second drain pan.

4. A method comprising: attaching a drain pan to an aircraft proximate an engine, the drain pan comprising a composite material forming a reservoir and a drain; catching a liquid from the engine in the reservoir of the drain pan; draining the liquid from the reservoir through the drain; and supporting a step load on the reservoir of the drain pan by a flange of the reservoir, wherein the drain pan is operable to withstand a fire burning at about 2000 degrees Fahrenheit for at least 15 minutes, and wherein the reservoir comprises: a sloped portion sloping toward the drain at a constant slope along a first direction; and a curved portion sloping toward the drain at a varying slope along a second direction, wherein the first direction and the second direction are perpendicular to one another.

5. The method of claim 4, further comprising:
coating at least a portion of the drain pan with a fire-resistant material.

6. The method of claim 4, further comprising:
receiving, for a duration of at least 15 minutes, a fire burning at about 2000 degrees Fahrenheit on the drain pan, while simultaneously receiving the fire:
continuing to catch the liquid from the engine in the reservoir of the drain pan; and
continuing to drain the liquid from the reservoir through the drain.

7. The method of claim 4, wherein the drain pan is a first drain pan, the method further comprising:
attaching a second drain pan to the aircraft, wherein the first drain pan and the second drain pan abut one another and form a crest; and
guiding flow of the liquid from the crest into the first drain pan and the second drain pan.

8. The method of claim 4, further comprising:
transferring the liquid from the drain to an outlet through a tube coupled to the drain.

9. The aircraft of claim 2, wherein the fire-resistant material increases a fire-resistance of the drain pan by 25% or more.

10. The aircraft of claim 1, wherein the liquid comprises one selected from the group consisting of: a petroleum-based fuel, a coolant, a hydraulic fluid, and a lubricant.

11. The aircraft of claim 1, wherein the polymeric resin comprises a thermosetting polymer.

12. The aircraft of claim 1, wherein the polymeric resin comprises bismaleimide (BMI) resin and/or epoxy resin.

13. The aircraft of claim 1, further comprising:
a tube coupled to the drain, the tube transferring the liquid from the drain to an outlet.

14. An aircraft comprising:
an engine; and
a drain pan comprising:
a composite material comprising a polymeric resin and a reinforcing fiber, wherein the composite material forms:
a reservoir to catch a liquid from the engine,
a drain to drain the liquid from the reservoir, and
a flange for supporting a step load on a portion of the aircraft,
wherein the drain pan is operable to withstand a fire burning at about 2000 degrees Fahrenheit for at least 15 minutes,
wherein the drain pan is a first drain pan and further comprising a second drain pan, and
wherein the first drain pan and the second drain pan abut one another and form a crest from which the liquid can flow into the first drain pan and the second drain pan.

15. The aircraft of claim 14, further comprising:
a fire-resistant material coating the composite material.

16. The aircraft of claim 15, wherein the fire-resistant material increases a fire-resistance of the drain pan by 25% or more.

17. The aircraft of claim 14, wherein the reservoir formed by the composite material comprises:
a shape comprising:
a sloped portion sloping toward the drain at a constant slope along a first direction; and
a curved portion sloping toward the drain at a varying slope along a second direction, wherein the first direction and the second direction are perpendicular to one another.

18. The aircraft of claim 14, wherein the liquid comprises one selected from the group consisting of: a petroleum-based fuel, a coolant, a hydraulic fluid, and a lubricant.

19. The aircraft of claim 14, wherein the polymeric resin comprises at least one of a thermosetting polymer, bismaleimide (BMI) resin and epoxy resin.

20. The aircraft of claim 14, further comprising:
a tube coupled to the drain, the tube transferring the liquid from the drain to an outlet.

* * * * *